United States Patent [19]

Priddy et al.

[11] Patent Number: 5,100,235
[45] Date of Patent: Mar. 31, 1992

[54] LASER-RING GYRO BEAM INTENSITY MONITOR

[75] Inventors: Lloyd W. Priddy, Mahtomedi; Timothy M. Buck, Blaine, both of Minn.

[73] Assignee: Honeywell Inc., Minneapolis, Minn.

[21] Appl. No.: 557,281

[22] Filed: Jul. 24, 1990

[51] Int. Cl.$^5$ .............................................. G01B 9/02
[52] U.S. Cl. ........................................ 356/350; 372/94
[58] Field of Search ................ 356/350, 349; 372/94

[56] References Cited

U.S. PATENT DOCUMENTS

| | | |
|---|---|---|
| 3,642,373 | 2/1972 | Catherin . |
| 4,017,187 | 4/1977 | Schwartz ................... 356/106 LR |
| 4,282,495 | 8/1981 | Ljung ................... 356/350 |
| 4,284,964 | 8/1981 | Maier, Jr. ................... 331/94.5 S |
| 4,481,635 | 11/1984 | Broberg et al. ................... 356/350 |
| 4,575,658 | 3/1986 | Kay ................... 315/111.21 |
| 4,641,970 | 2/1987 | Gustafson et al. ................... 356/350 |
| 4,795,258 | 1/1989 | Martin ................... 356/350 |
| 4,813,774 | 3/1989 | Dorschner et al. ................... 356/350 |
| 4,863,273 | 9/1989 | Nishiura ................... 356/350 |

FOREIGN PATENT DOCUMENTS 185385A 12/1985 European Pat. Off. .

OTHER PUBLICATIONS

Morrison et al., A Missile Laser Gyro Rate Sensor, 8/76, pp. 1-5.
Morrison et al., The Slic-15 Laser Gyro IMU for Mid-course Missile Guidance, 1976, pp. 59-68.
K. Thomson, Integrated 3 Axis Laser Gyro, 1978, pp. 13-20.

Primary Examiner—Samuel Turner
Assistant Examiner—Richard K. Kurtz, II
Attorney, Agent, or Firm—Robert A. Pajak

[57] ABSTRACT

RLG beam intensity monitor in which the beam intensity information is derived from the a.c. output of the RLG angular rate sensor.

9 Claims, 2 Drawing Sheets

LASER-RING GYRO BEAM INTENSITY MONITOR

CROSS REFERENCE TO RELATED APPLICATION

The disclosure of this application is related in subject matter to that of U.S. application Ser. No. 07/560,406 filed 7/31, 1990, by Joseph Killpatrick for "Improved Laser Beam Control For A Ring-Laser Gyro" (Honeywell Docket No. A4112516), which is assigned to the assignee of this application. The disclosures of that application are incorporated herein by reference.

BACKGROUND OF THE INVENTION

1. Field of the Invention

The present invention generally relates to a gas laser angular rate sensor, also known and referred to in the art as a Ring-Laser Gyro (RLG), and more particularly to an improved system for monitoring laser beam intensity.

2. Description of the Prior Art

An integral part of a ring-laser gyro is the laser beam source or generator. One type of laser beam generator comprises electrodes and a discharge cavity in combination with a plurality of mirrors which define a closed path. The path is usually triangular but other paths such as rectangular can be used.

Present day ring-laser gyros employ a gas discharge cavity filled with a gas which is excited by an electric current passing between the electrodes ionizing the gas and creating a plasma. As is well understood by those skilled in the art, the ionized gas produces a population inversion which results in the emission of photons, and in the case of He-Ne, a visible light is generated which is indicative of the plasma. If the gas discharge cavity is properly positioned with respect to the plurality of mirrors, the excited gas will result in two counterpropagating laser beams traveling in opposite directions along an optical, closed-loop path defined by the mirrors.

In some embodiments of ring laser gyros, a unitary body provides the gas discharge cavity including the optical closed-loop path. Such a system is shown in U.S. Pat. No. 3,390,606 by Podgorski, which is assigned to the same assignee as the present invention. There an optical cavity is formed in a unitary block. A selected lasing gas is used to fill the optical cavity. Mirrors are positioned around the optical cavity at appropriate locations such that counterpropagating beams are reflected so as to travel in opposite directions along the optical cavity. A gas discharge is created in the gas filled optical cavity by means of an electrical current flowing in the gas between at least one anode and at least one cathode which are both in communication with the gas filled optical cavity.

It should be noted that prior art ring-laser gyro systems often have a pair of anodes and a single cathode which produce two electrical currents flowing in opposite directions. Each of the electrical discharge currents create plasma in the gas. Each current is established by an applied electrical potential, of sufficient magnitude, between one cathode and one anode.

In prior art RLGs, a photodetector optically coupled to one of the two counter-rotating laser beams produces a d.c. output signal whose magnitude is a function of the beam intensity. While satisfactory for some applications, in other applications this beam monitoring system is not satisfactory because of a varying d.c. bias in the sensor output caused by residual light generated in the gas discharge referred to in the art as "glow".

In prior art RLGs, energy from the two counter-rotating laser beams are optically folded and superimposed onto an optical detector. The two beams interfere with each other to form a moire fringe pattern. Differences in frequency of the two laser beams, caused by a rotation of the gyro, result in an alternating intensity of the light energy on the optical detector and corresponding a.c. output. This a.c. output corresponds to the angular motion of the gyro and forms the gyro output signal.

SUMMARY OF THE INVENTION

It is therefore an object of the present invention to provide an improved RLG beam intensity monitor system which is not susceptible to glow.

Briefly, this invention contemplates the provision of RLG beam intensity monitor in which the beam intensity information is derived from the magnitude of the a.c. output of the RLG angular rate sensor. By looking only at the magnitude of the a.c. output, the errors caused by the gas discharge "glow" are eliminated.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
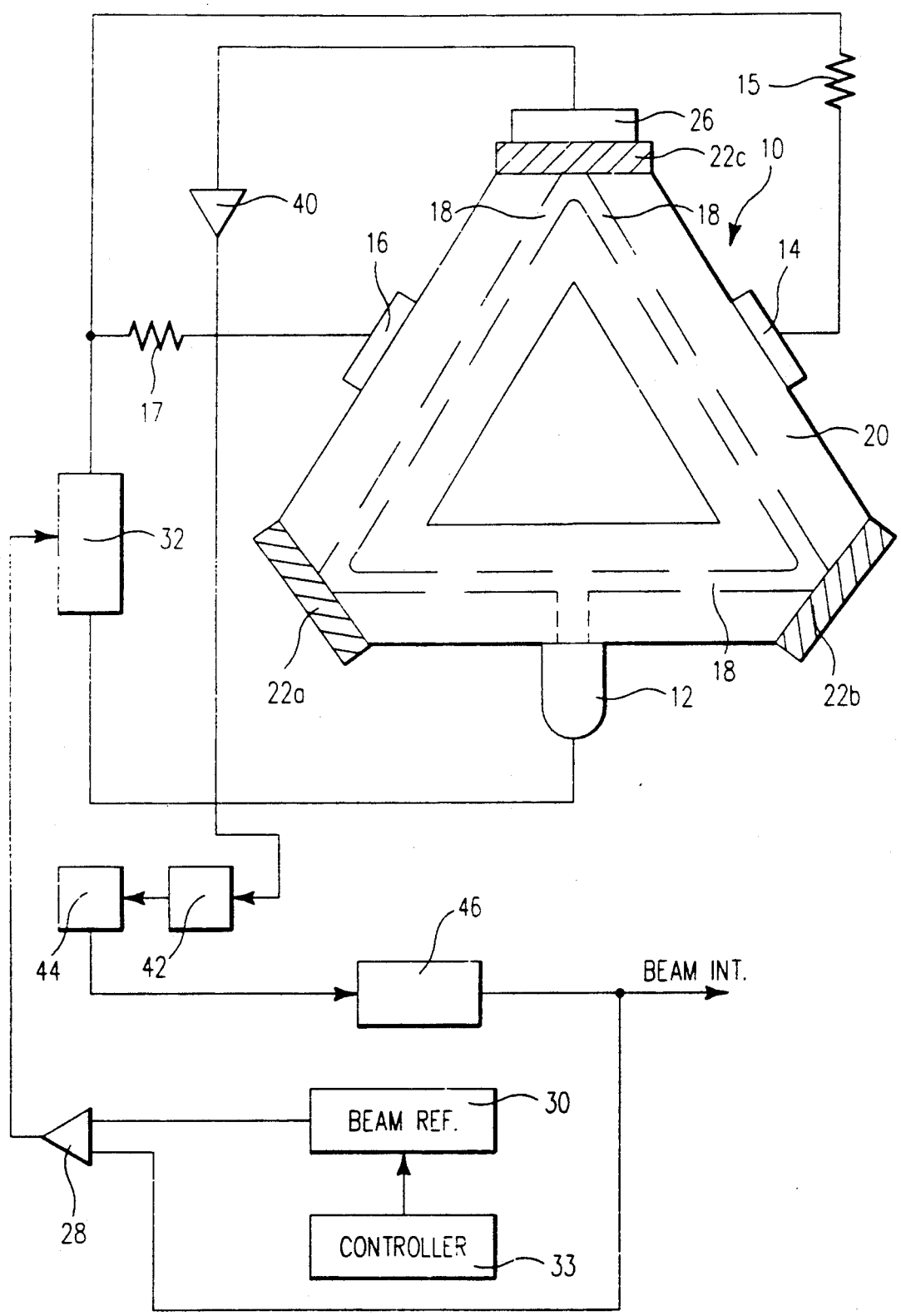
FIG. 1 is a schematic and block diagram drawing of an RLG and a current supply system in accordance with the teachings of this invention.

Referring now to FIG. 1, a solid block ring-laser gyro of the type in widespread commercial use today, designated by the general reference numeral 10, has a cathode 12 and two anodes 14 and 16. The RLG has three channels 18 formed in a solid, thermostable block 20 and three mirrors 22a, 22b and 22c at the intersections of the channels. The RLG in this specific embodiment of the invention is itself conventional and described in more detail in U.S. Pat. No. 3,390,606 to Podgorski. It should be noted that while the specific embodiment of the invention described herein employs one cathode and two anodes, the invention is equally applicable to RLG with a single anode, and with RLGs of various designs and configuration.

One of the three mirrors, 22c, is partially transmissive. A rotational rate output sensor 26 comprises a photodetector which is optically coupled through the mirror 22c so that it produces a sinusoidal output signal in response to the light and dark fringe pattern generated by the counter-rotating interfering laser beams. The amplitude of the a.c. output signal of sensor 26 is proportional to the beam intensity of the two counter-rotating laser beams. In accordance with this invention, the a.c. current output signal of sensor 26 is a.c. coupled to a rectifier and integrator to generate a d.c. signal whose magnitude is therefore proportional to the beam intensity.

An amplifier 40, such as a Linear Technologies amplifier LT1012, preferably converts the sinusoidal current signal from the sensor 26 to a sinusoidal voltage signal.

A band pass filter 42 filters the output of the amplifier 40 to remove noise from the signal, and couples the signal to the input of a rectifier 44 and integrator 46, whose d.c. output is proportional to the laser beam intensity. As will be appreciated by those skilled in the art, this d.c. signal may be utilized in the same way and for the same purposes as the output of a prior art beam intensity monitor optically coupled to a single beam. In addition, as is disclosed in co-pending application Ser. No. 07/560,406, the output of the rectifier 44 may be coupled as one input to a comparator 28 whose other input is a reference 30 which is proportional to a desired beam intensity. The comparator output is coupled to a power supply 32. The output of the comparator controls current input to the RLG so that the beam intensity is maintained constant.

Figure 2:
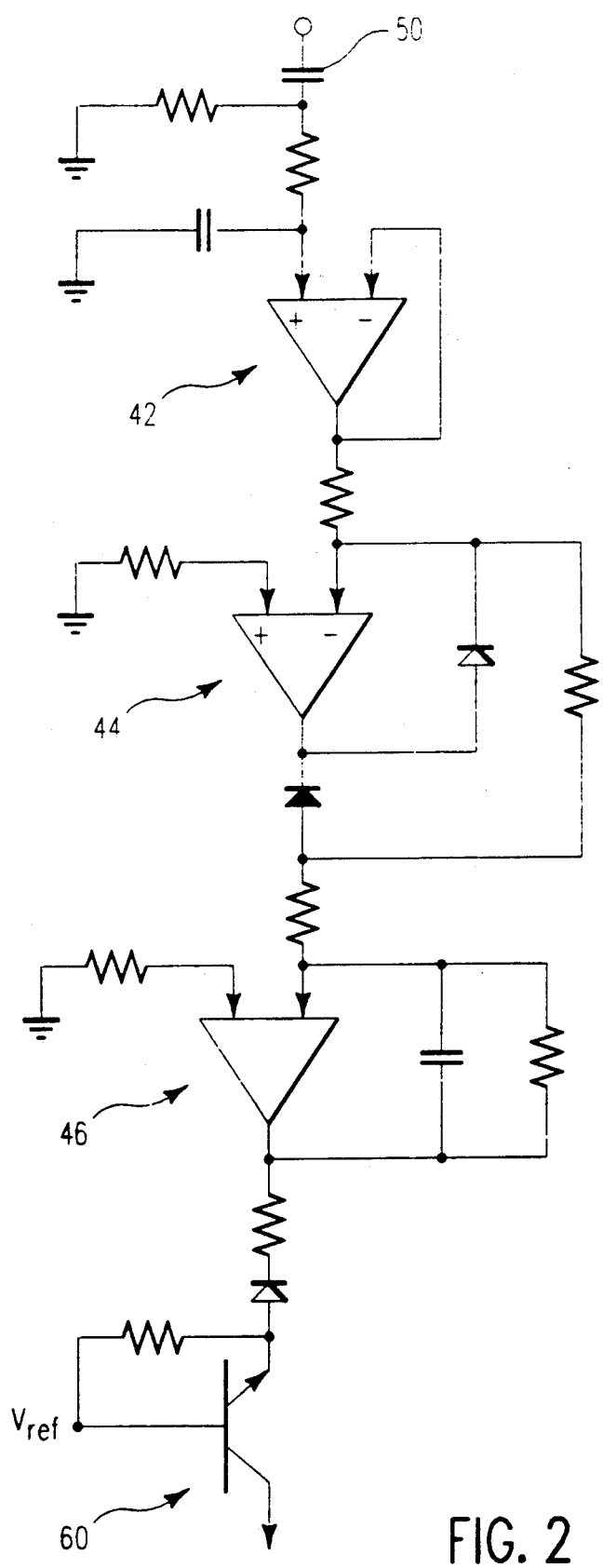
FIG. 2 is a somewhat more detailed schematic drawing of a portion of the supply system shown in FIG. 1.

FIG. 2 shows aspects of the system of FIG. 1 in more detail. A capacitor 50 couples the a.c. output of amplifier 40 to the input of a band pass filter 42 which filters out noise components in the a.c. signal. A half wave rectifier without offset 44 converts the a.c. signal to a variable d.c. signal which is integrated by a low pass filter 46. If desired, the d.c. output of the filter 46, whose d.c. voltage is a function of the beam intensity, can be converted to a current signal by amplifier 60.

While the invention has been described in terms of a single preferred embodiment, those skilled in the art will recognize that the invention can be practiced with modification within the spirit and scope of the appended claims. For example, while the preferred embodiment of the invention involves rectification and integration of the a.c. output signal from the gyro in order to determine the magnitude of the a.c. signal and thus beam intensity, alternative methods may be used to determine the magnitude of the a.c. signal. For example, an analog to digital converter may be used to convert the a.c. signal to a series of digital values and the peak values or average peak values determine as a measure of the magnitude of the a.c. signal and hence the beam intensity.

Having thus described my invention, what I claim as new and desire to secure by Letters Patent is as follows:

1. In a ring laser angular rate sensor wherein a substantially thermally and mechanically stable block provides a plurality of interconnected cavities therein, selected ones of said plurality of interconnected cavities being interconnected to form a closed-loop path to permit light to travel along said closed-loop path, wherein said plurality of interconnected cavities contain an active gas which can freely communicate within said plurality of cavities, wherein a portion of an anode is in communication with said gas in one of said plurality of interconnected cavities, wherein a portion of a cathode is in communication with said gas in one of said plurality of cavities, said cathode and said anode each being electrically connected to at least a first electric potential of sufficient magnitude to establish an electric potential to maintain an electrical current, once established by ionization of said gas, between said anode and said cathode through said gas to cause two laser beams to travel in opposite directions through said selected ones of said cavities forming said closed-loop path, a combination comprising:

a photodetector optically coupled to said closed-loop path for producing a sinusoidal output signal in response to a pattern of light and dark interference fringes generated by said two laser beams traveling in opposite directions through said closed-loop path; and means to generate a d.c. signal from said sinusoidal output signal whose d.c. magnitude is a function of an intensity of said beams.

2. In a ring laser angular rate sensor wherein a substantially thermally and mechanically stable block provides a plurality of interconnected cavities therein, selected ones of said plurality of interconnected cavities being interconnected to form a closed-loop path to permit light to travel along said closed-loop path, wherein said plurality of interconnected cavities contain an active gas which can freely communicate within said plurality of cavities, wherein a portion of an anode is in communication with said gas in one of said plurality of interconnected cavities, wherein a portion of a cathode is in communication with said gas in one of said plurality of cavities, said cathode and said anode each being electrically connected to at least a first electrode potential of sufficient magnitude to establish an electric potential to maintain an electrical current, once established by ionization of said gas, between said anode and said cathode through said gas to cause two laser beams to travel in opposite directions through said selected ones of said cavities forming said closed-loop path, a combination comprising:

a photodetector optically coupled to said closed-loop path for producing a sinusoidal output signal in response to a pattern of light and dark interference fringes generated by said two laser beams traveling in opposite directions through said closed-loop path; and means to rectify and integrate said sinusoidal signal to generate a d.c. signal whose magnitude is a function of an intensity of said beams.

3. In a ring laser angular rate sensor wherein a substantially thermally and mechanically stable block provides a plurality of interconnected to form a closed-loop path to permit light to travel along said closed-loop path, wherein said plurality of interconnected cavities contain an active gas which can freely communicate within said plurality of cavities, wherein a portion of an anode is in communication with said gas in one of said plurality of interconnected cavities, wherein a portion of a cathode is in communication with said gas in one of said plurality of cavities, said cathode and said anode each being electrically connected to at least a first electric potential of sufficient magnitude to establish an electric potential to maintain an electrical current, once established by ionization of said gas, between said anode and said cathode through said gas to cause two laser beams to travel in opposite directions through said selected ones of said cavities forming said closed-loop path, a combination comprising:

a photodetector optically coupled to said closed-loop path for producing a sinusoidal output signal in response to a pattern of light and dark interference fringes generated by said two laser beams traveling in opposite directions through said closed-loop path; and means to generate a signal from said sinusoidal output signal whose magnitude is a function of an intensity of said beams.

4. In a ring laser angular rate sensor as in claim 2 wherein said means to rectify and integrate include means to a.c. couple said sinusoidal signal to the input of a rectifier.

5. In a ring laser angular rate sensor as in claim 1 wherein said photodetector produces a sinusoidal current signal and further including means to transform said current signal to a sinusoidal voltage signal.

6. In a ring laser angular rate sensor as in claim 2 wherein said photodetector produces a sinusoidal current signal and further including means to transform said current signal to a sinusoidal voltage signal.

7. In a ring laser angular rate sensor as in claim 4 wherein said coupling means includes a band pass filter.

8. In a ring laser angular rate sensor as in claim 4 wherein said means to rectify and integrate include means to a.c. couple said sinusoidal signal to the input of a rectifier.

9. In a ring laser angular rate sensor as in claim 8 wherein said coupling means includes a band pass filter.

* * * * *

UNITED STATES PATENT AND TRADEMARK OFFICE
CERTIFICATE OF CORRECTION

PATENT NO. : 5,100,235
DATED : March 31, 1992
INVENTOR(S) : Lloyd W. Priddy and Timothy M. Buck It is certified that error appears in the above-identified patent and that said Letters Patent is hereby corrected as shown below:

Column 4, Line 36, after "interconnected" insert --cavities therein, selected ones of said plurality of interconnected cavities being interconnected--

Signed and Sealed this

Fifth Day of October, 1993

Attest:

BRUCE LEHMAN

Attesting Officer

Commissioner of Patents and Trademarks